(12) United States Patent
Fagerberg et al.

(10) Patent No.: US 12,104,983 B2
(45) Date of Patent: Oct. 1, 2024

(54) PRESSURE TEST INSERT AND FRAME

(71) Applicant: MCT Brattberg AB, Karlskrona (SE)

(72) Inventors: Ola Fagerberg, Karlskron (SE); Anders Karlsson, Karlskron (SE)

(73) Assignee: MCT BRATTBERG AB, Karlskrona (SE)

( * ) Notice: Subject to any disclaimer, the term of this patent is extended or adjusted under 35 U.S.C. 154(b) by 79 days.

(21) Appl. No.: 17/858,380

(22) Filed: Jul. 6, 2022

(65) Prior Publication Data
US 2023/0012985 A1 Jan. 19, 2023

(30) Foreign Application Priority Data

Jul. 16, 2021 (SE) .................................. 2150956-7

(51) Int. Cl.
G01M 3/28 (2006.01)
F16L 5/02 (2006.01)

(52) U.S. Cl.
CPC ............ G01M 3/2853 (2013.01); F16L 5/02 (2013.01)

(58) Field of Classification Search
CPC .... G01M 3/2853; G01M 3/28; G01M 3/2838; G01M 3/2815; F16L 5/02; F16L 5/08; F16L 5/00; H02G 3/22
See application file for complete search history.

(56) References Cited

U.S. PATENT DOCUMENTS 4,764,422 A * 8/1988 Hill .......................... H02G 3/22
428/322.2

2003/0110719 A1 * 6/2003 Broder ...................... F16L 5/14
52/220.8
2004/0103600 A1 6/2004 Broder et al.

FOREIGN PATENT DOCUMENTS

| EP | 0798504 A1 | 10/1997 |
| EP | 1311044 A2 | 5/2003 |
| EP | 1479958 A1 | 11/2004 |
| EP | 1311044 B1 | 8/2007 |
| EP | 3798495 A1 | 3/2021 |
| WO | 2008140399 A1 | 11/2008 |
| WO | 2010071530 A1 | 6/2010 |
| WO | 2010089286 A2 | 8/2010 |
| WO | 2021126047 A1 | 6/2021 |

OTHER PUBLICATIONS

European Search Report from corresponding European Patent Application No. 22178666.8, dated Nov. 11, 2022, 8 pages.
H. Deng, et al. "Conductive polymer tape containing highly oriented carbon nanofillers", Journal of Applied Polymer Science, vol. 113, No. 2, Jul. 15, 2009, pp. 742-751.

(Continued)

Primary Examiner — David Z Huang
(74) Attorney, Agent, or Firm — Ronald M. Kachmarik; Cooper Legal Group LLC

(57) ABSTRACT

An insert half for sealing around a cable, pipe or wire. The half includes a body with a first end and a second end, a first side intended to be arranged towards a corresponding first side of a substantially identical half, forming an insert block, and a groove arranged in the first side and extending between the first and second end along an axis A. The body includes a fluid permeable layer extending in a plane transverse to the longitudinal direction of the axis A. An insert block may include two halves. A sealing system may include plural blocks.

11 Claims, 9 Drawing Sheets

(56) References Cited

OTHER PUBLICATIONS

Swedish Search Report from corresponding Swedish application No. 2150956-7, dated Mar. 30, 2022, 6 pages.
Objection to corresponding Swedish Patent Application No. 2150956-7, filed Sep. 27, 2023, 12 pages.
GK Marine Brochure, EMC/NEMP Packing System, Mar. 2003, 4 pages.
GK Marine Brochure, GK Packing Systems, Jul. 2008, 60 pages.
Semipermeable membrane, Wikipedia, Nov. 14, 2020, 3 pages.

* cited by examiner

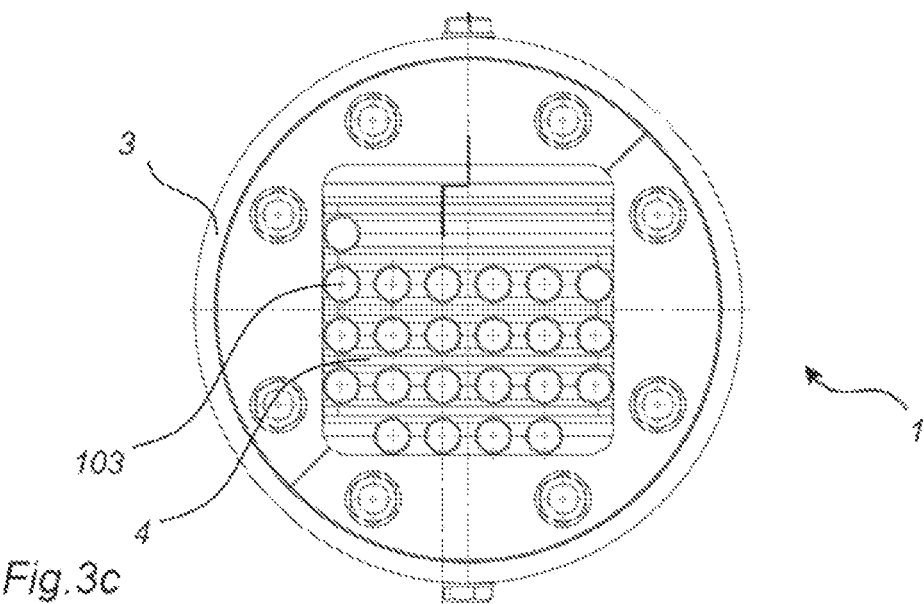

PRESSURE TEST INSERT AND FRAME

FIELD OF THE INVENTION

The present invention relates to an insert half for sealing around a cable, wire or pipe, and an insert block comprising two of said insert halves.

BACKGROUND OF THE INVENTION

Within many different technical fields, like for example merchant ships, offshore platforms and buildings with content of high importance there are several safety aspects that must be considered to avoid severe damages to the content within the structure as well as peoples working in, or close to, the area in case of accidents like for example fire or leaking water or gas from the outside or within the platform, ship or building.

In case of explosion, fire or leaking water, the fire and/or leaking water and gas are often spread along wires, cables or pipes and in order to stop, or at least delay, the fire, water or gas from spreading within the structure, each cable, wire or pipe must be sealed where they are lead through partition walls within the platform, ship or building.

One frequently used sealing system that provide a reliable sealing of cables, wires or pipes extending through partition walls involves a metal frame permanently installed in the partition wall to provide a passage of a predetermined size for the cables, wires or pipes in the desired area of the partition wall. The cables, wires or pipes are during installation lead through the frame. The space within the frame is during installation of the sealing system filled with insert blocks packed in layers within the frame to completely fill the space within the frame. Each insert block consists of two insert block halves each provided with a semi-circular groove in one side of the block half such that a circular passage is formed through the insert block when the two block halves are put together. Each cable, wire or pipe extending through the frame is fitted in an insert block and packed within the frame. The outside dimensions of the insert blocks are selected so that a predetermined number of insert blocks have a size corresponding to the space within the frame. After the blocks are packed side by side in layers in the intended position a pressure applying device is arranged in the top part of the frame. The pressure applying device, upon activation, applies a pressure on the blocks to press the blocks together and provide the desired sealing around the cables, wires, or pipes within the frame.

While such a sealing system is an efficient solution it must be determined that the system is effectively sealed before the wires, cables or pipes are placed therein. This may however prove difficult due to the configuration with a plurality of passages through the system. Traditional methods have included expensive and inconvenient solutions for determining pressure drop, for example using compressed air, a manometer, or double bulkhead systems.

In document EP1311044B1 insert halves comprising bores for this purpose are described. A plurality of insert blocks are assembled in a frame, sealing against one another and against the frame. The grooves and bores then form an internal network defining a test volume sealed against the exterior. The network of bores and openings may then be pressurized from the exterior and leakage detected through the measuring of pressure loss. Unfortunately, this type of insert blocks may be difficult to manufacture which may increase costs. Further, the bores have a risk of clogging and it would generate a considerably amount of waste material.

There is consequently a need for an improved insert half, insert block, and sealing system, that may ensure the desired sealing before it is utilized in a partition wall and reduce the problems described above.

SUMMARY

The present invention relates to an insert half for sealing around a cable, pipe, or wire, that to at least some extent reduces the problems defined above, i.e. with improved efficiency in detecting leakage and decreased risk of malfunctioning.

According to a first aspect of the present invention, there is provided an insert half for sealing around a cable, pipe, or wire. The insert half comprising: a body having a first and a second end. A first side intended to be arranged towards a corresponding first side of a substantially identical insert half, forming an insert block. A groove arranged in said first side and extending between the first and second end along an axis A, characterized in that the body comprises a fluid permeable layer extending in a plane transverse to the longitudinal direction of the axis A.

The present invention may be beneficial as an insert half according to the present invention may facilitate the detection of leakage. The fluid permeable layer may benefit the insert half as detection leakage using a pressure test may be enhanced. The present invention facilitates the determination due to its configuration which is both efficient and secure as it may decrease the risk of malfunctioning.

According to an embodiment of the present invention, the insert half further comprises a second side opposite the first side. The fluid permeable layer extends from the first side to the second side, wherein the groove arranged in the first side is in fluid connection with the outside surface of the second side.

The present embodiment may be advantageous as the present configuration may increase the efficiency in determining leakage during a pressure test. The fluid permeable layer may in the present embodiment connect two opposite sides of the insert half. Thus, the embodiment may enable a pressure test arrangement wherein a plurality of insert halves may create a fluidly connected system through the fluid permeable layer. Thus, the pressure test may be facilitated as a plurality of insert halves may be utilized and be interconnected through the fluid permeable layers extending from the first to the second side of the insert half.

According to an embodiment of the present invention, the fluid permeable layer is arranged essentially with equal distance to the first end and the second end. In other words, the fluid permeable layer is arranged essentially in the middle of the insert block in the direction along the axis A. Thus, having the insert half body sealing the permeable membrane in the direction of the axis A.

The present embodiment may be especially beneficial in embodiments where a single insert block is arranged in the direction of the axis A, in the frame. The present embodiment may thus provide an insert block having improved efficiency and durability in leakage detection.

According to an embodiment of the present invention, the fluid permeable membrane comprises a polymer material.

The polymer material in the present embodiment may for example comprise a synthetic polymer material such as a synthetic plastic material or natural polymer material. The present embodiment may be beneficial as a polymer material may be flexible and durable in usage as well as being a cost-efficient material, facilitating the pressure testing as well as the production of the insert half. Further the polymer material may be chosen for specific properties, such as fluid permeability.

According to an embodiment of the present invention, the fluid permeable membrane comprises a synthetic semipermeable material.

The present embodiment may be beneficial as the material may be penetrated by fluids such as water but not any larger molecules. Further, the material may be penetrable depending on the pressure applied to the membrane which may be beneficial in pressure loss. The material of the embodiment may be may thus further facilitate the pressure loss detection and increase the reliability.

According to an embodiment of the present invention, the membrane layer has a width in the range of 2-5 mm.

The present embodiment may be further beneficial as leakage detection may be improved, and especially in the range of 3-4 mm.

According to an embodiment of the present invention, the insert half body has a rectangular cross-sectional shape transvers to axis A.

The present embodiment may be advantageous as the rectangular outside shape may facilitate the arrangement of insert halves in a frame. The configuration may enable an easy to assemble system with increased sealing properties.

According to an embodiment of the present invention, the groove has a substantially semi-cylindrical or rectangular cross-sectional shape along axis A.

The present embodiment may be advantageous as the configuration may facilitate arrangement around wires, cables or pipes and enable a tight seal.

According to an embodiment of the present invention, an insert block is formed by two insert halves according to claim 1 arranged with their respective groove facing each other such that a passage intended for a cable, wire or pipe is formed.

The present embodiment enables a wire, cable or pipe to be arranged through an insert block, which may facilitate the usage of the insert block in construction and during pressure test.

According to a second aspect of the present invention, there is provided a sealing system for sealing around cables, wires or pipes extending through a partition wall, said system comprising: a frame arranged in the partition wall, a plurality of insert blocks according to claim 9 fitted around the cables, wires or pipes and arranged within the frame such that a fluid communication system is formed by the fluid permeable layers of the plurality of insert blocks. A pressure applying device arranged within the frame to apply a pressure on the plurality of insert blocks within the frame to seal the space within the frame between the plurality of insert blocks and the pressure applying device. And a device intended to be connected to a supply of pressurized fluid and direct the pressurized fluid to the communication system formed by the permeable layers of the plurality of insert blocks.

The present system may be arranged for determining leakage in the installation of wires, cables, or pipes through a partition wall. The present system facilitates the determination due to its configuration which is both efficient and secure, decreasing the risk of malfunctioning in comparison to the systems as described in the prior art.

According to an embodiment of the present invention, the sealing system is connected to a source of compressed fluid and a gauge showing pressure loss.

The present embodiment may be advantageous as the configuration with a gauge and a source of compressed fluid may be a cost and resource efficient solution for the detection of leakage in a system as described. Further, it may be easy to use and reliable, decreasing the risk of malfunctioning.

According to an embodiment of the present invention, the sealing system is connected to a liquid leak detection source.

The present embodiment may be advantageous as a liquid leak detection source may further facilitate the leakage detection.

According to a third aspect of the present invention, there is provided a method comprising a sealing system according to claim 10, comprising the steps of:
 a. fitting one insert block around each cable, wire, or pipe extending through the frame,
 b. arranging the insert blocks in the frame (3)
 c. seal the sealing system with the pressure applying device;
 d. applying the pressurized fluid to the communication system formed by the fluid permeable layers (105) of the plurality of insert blocks; and
 e. detecting potential pressure loss to verify acceptable installation.

According to an embodiment of the present invention, the method further comprises the step of gradually increasing the pressure of the applied pressurized fluid for detecting potential pressure loss.

The present embodiment may be beneficial as a gradually increasing pressure may facilitate the leakage detection. The gradual increase may for example be stepwise or ramping. This may be beneficial in terms of usage and resource efficiency.

According to an embodiment of the present invention, the method further comprises a detected pressure loss is compared to a predetermined pressure loss threshold for an acceptable installation.

A threshold for an acceptable installation may be utilized for determining a sufficient seal. The present embodiment may be beneficial as the threshold may be set at any desired level for an insert block and frame.

BRIEF DESCRIPTION OF THE DRAWINGS

The above, as well as additional objects, features, and advantages of the present invention, will be better understood through the following illustrative and non-limiting detailed description of embodiments of the present invention. Reference will be made to the appended drawings, on which:

FIGS. 3a, 3b and 3c illustrates a schematic view of a sealing system comprising insert halves and a circular frame according to the invention.

DETAILED DESCRIPTION

Figure 1:
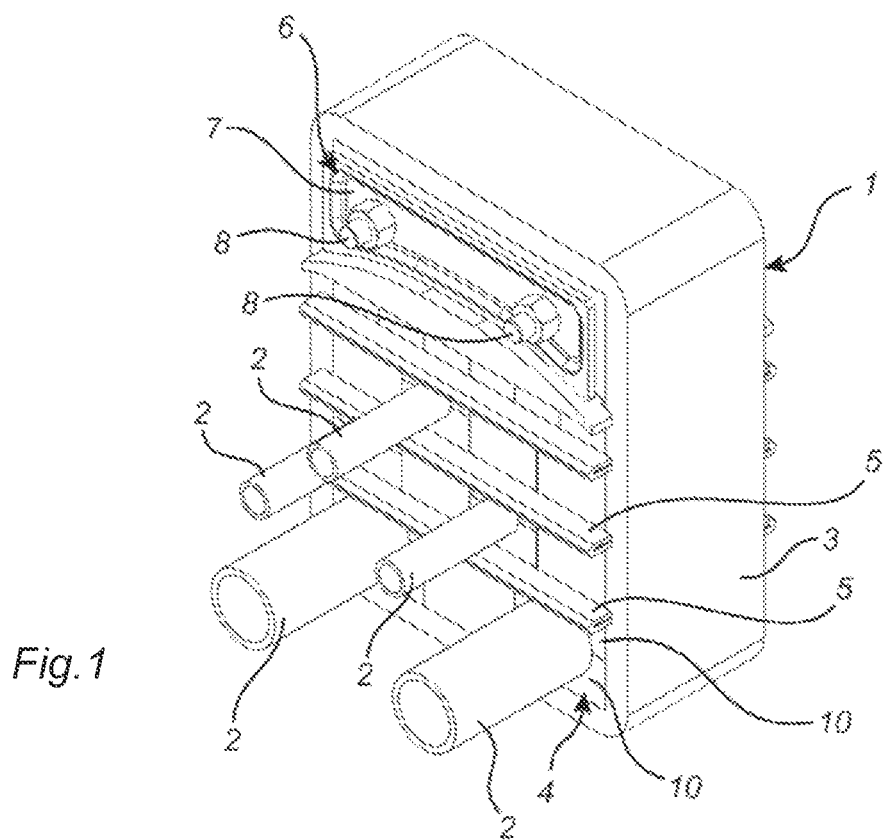
FIG. 1 illustrates a perspective view of a sealing system comprising a rectangular frame and insert halves and insert blocks according to the invention.

In FIG. 1 there is illustrated a sealing system 1 for sealing of cables 2, wires or pipes extending through a not illustrated partition wall. The system involves a frame 3 intended to be permanently installed in the partition wall to provide a passage of a predetermined size in the partition wall. The cables, wires or pipes that need to pass through the partition wall are during installation lead through the frame. The depicted frame is rectangular; however, other embodiments may utilize frames of other geometrical shapes. For example, a circular frame may be beneficial in certain arrangements.

In order to seal the space within the frame an insert block 4, comprising two substantially identical insert block halves 10, is fitted around each of the cables, wires or pipes extending through the frame. The insert halves further comprise a permeable layer extending in a planar direction to an axis A extending between the first and second end of an insert half. The permeable layer may be arranged at one of said first and second end, or may be arranged in between the ends, through the body of the insert half. Further, in this embodiment the permeable layer is connecting a first side, where the cables 2, wires or pipes wire is arranged, with the opposite side of the insert half. The insert blocks 4, and the cables 2, wires or pipes extending through the insert block 4, are packed in layers within the frame 3 to completely fill the space within the frame 3. The insert blocks 4 are made of an elastic material, preferably a rubber material, and have substantially square cross sectional shape and the outside dimensions of the insert blocks 4 are selected so that a predetermined number of insert blocks 4 have a size corresponding to the space within the frame 3 to fill the space within the frame 3 and provide the desired sealing of the passage in the partition wall. The number of insert blocks required may differ depending on the frame size, shape and the size and shape of the insert blocks. The different layers of insert blocks 4 are separated by a guiding metal plate 5 in order to ensure that the layers remain in the intended position within the frame 3 when pressure is applied on the sealing system 1. If the number of cables 2, wires or pipes is less than the number of insert blocks 4 required to fill the space within the frame 3, the insert blocks 4 could be replaced by a solid elastic block to fill the remaining spaces within the frame. The solid elastic block comprises similar features as the insert blocks 4 but does not comprise a through-hole. Both the insert blocks 4 and solid elastic blocks comprise a permeable layer and in some embodiments, a plurality of insert blocks may share a permeable layer. The insert blocks and solid elastic blocks arranged in a frame will form a fluid communication system by the fluid permeable layers.

Some embodiments require longer pipes, wires or cables to be arranged through a wider partition wall. In such embodiments the frame may be wider than in the depicted embodiment and there may thus be a need to utilize a plurality of insert blocks arranged along an axis A. In other words, there may be additional insert blocks arranged with its respective first end adjacent the second end of another insert block, thus multiple insert blocks may be arranged around a cable, wire or pipe. Such embodiments may utilize a permeable layer arranged on at least one of the ends of the insert blocks, or having an additional permeable layer arranged between insert blocks.

After the insert blocks 4 are packed side by side in layers in the intended position within the frame 3 a pressure applying device 6 is arranged in the top part of the frame 3. Other configurations are however also possible, for example utilizing multiple pressure applying devices arranged around the edges of the frame. The pressure applying device 6 depicted comprises a plate 7 arranged on each side of an elastic member and threaded shafts 8 extending through the elastic member. When the elastic member is compressed between the plates 7 by the shafts 8 and nuts arranged on the shaft the elastic element expand such that a pressure is applied on the layer packed within the frame 3 thereby eliminating gaps between the insert blocks 4 and sealing the space within the frame 3. Different types of pressure applying devices 6 are available and the described device could be replaced by anyone of the available devices.

Figure 2:
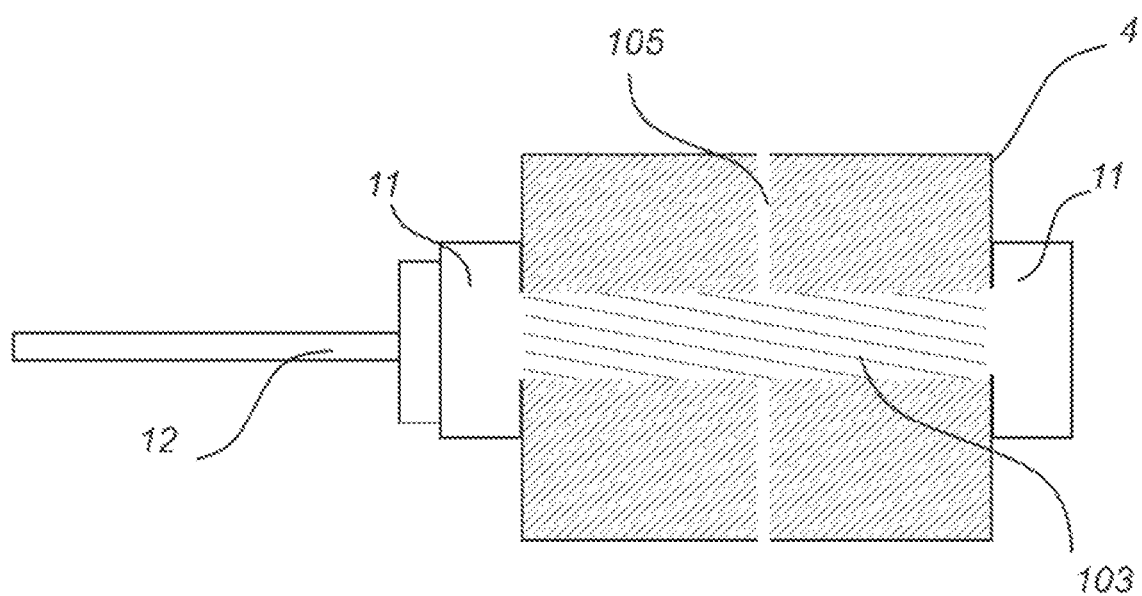
FIG. 2 illustrates a schematic view of an insert block and a fluid connection.

Depicted in FIG. 2 is an insert block 4, a connection member 11 and a fluid connection 12. The insert block 4 is arranged in a frame, not depicted, as described in regard to FIG. 1, along with a plurality of insert blocks 4 and solid elastic blocks. As the insert blocks 4, and solid elastic blocks, have been placed in a frame the insert blocks and solid elastic blocks will form a fluid communication system through the fluid permeable layers 105. As the space within the frame has been sealed with a pressure applying device, the pressure loss detection may be performed. The pressure loss detection is performed by applying a pressurized fluid from a device connected to a supply of pressurized fluid. The pressurized fluid travels from the supply, not depicted, through the fluid connection 12. The fluid connection in the present example is a hose or may comprise any other suitable alternative. The fluid passes through the connection member 11 into the insert block 4. As depicted, there are connection members 11 arranged on both sides of the insert block 4, fitting such that the through-hole 103 does not leak as the pressurized fluid is added to the insert block through the connection member. Said connection member 11 may in some embodiments further comprise a valve such that the fluid connection 12 may be removed from the connection member 11 without having the through-hole 103 exposed.

As the pressurized fluid has been added to the through hole 103 of the insert block 4, the fluid may distribute to the permeable layer 105 of the insert block 4. As the permeable layers 105 of the plurality of insert blocks 4 are in fluid connection, the pressurized fluid may reach all of the insert blocks 4 and solid elastic blocks arranged in the frame and leakage may thus be detected. Other embodiments may instead utilize a connection member 11 arranged through the wall section of a sealing system, immediately accessing the permeable layer 105 of at least one insert block 4.

The pressurized fluid can thus be used to determine pressure loss in any insert block 4 arranged in the frame 3. Some embodiments may utilize a gradual increase of the pressure applied to the fluid. This may further aid the identification of potential leakage in one or more insert blocks 4. In the present system, a detected pressure loss may also be compared to a predetermined pressure loss threshold which identifies an acceptable value. Thus, some degree of pressure loss may be acceptable if it does not surpass the determined threshold.

Figure 3A:
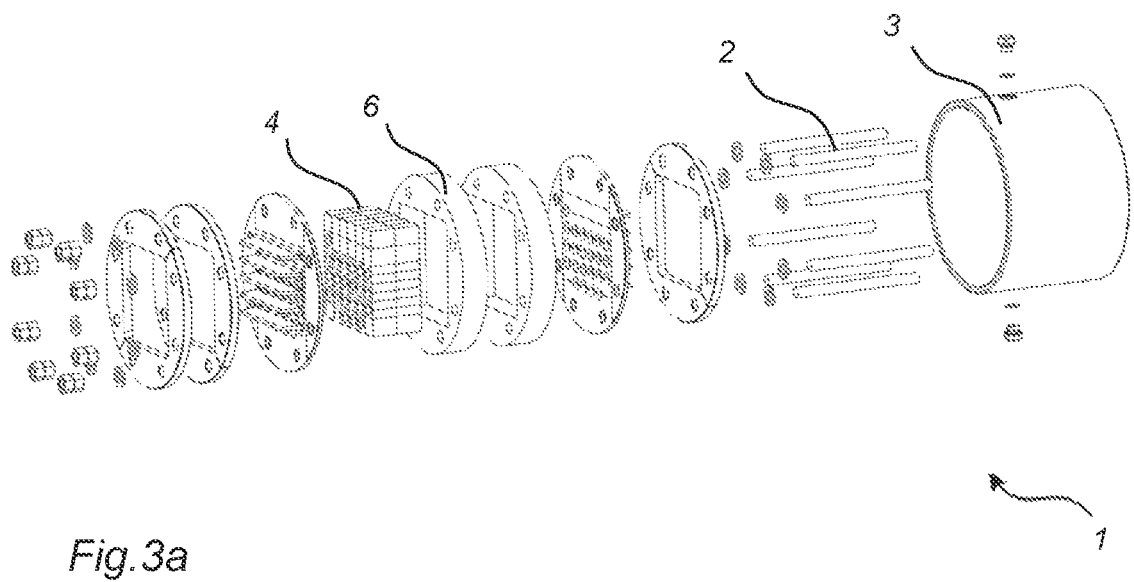
Figure 3B:
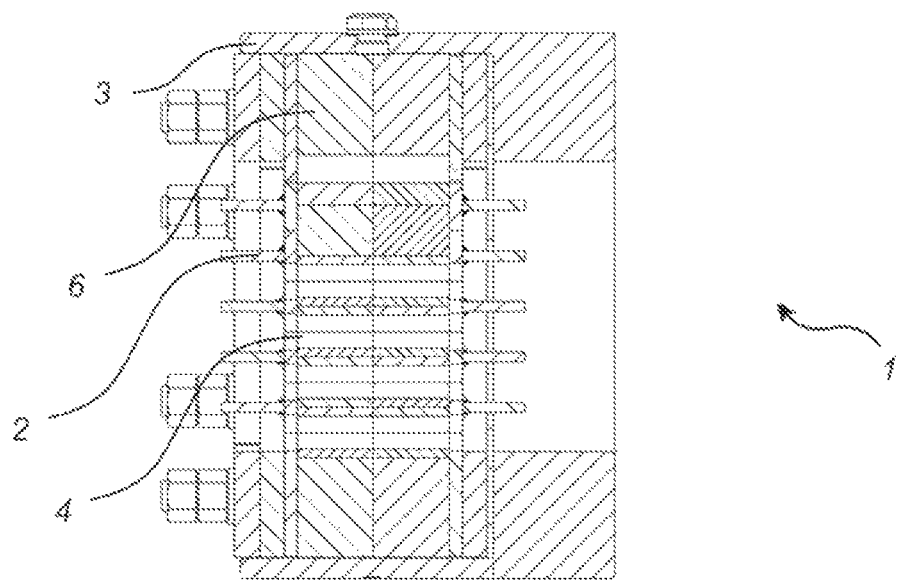

FIGS. 3a, 3b and 3c depicts schematic views of a sealing system 1 for sealing cables 2 wires or pipes, comprising a circular frame 3 according to some embodiments of the present invention. In the depicted embodiment the frame 3 is arranged with a plurality of insert blocks 4. Each insert block 4 is arranged with an essentially cylindrical through-hole 103, through the insert block as further described in reference to FIGS. 4a and 4b. Through the essentially cylindrical through-hole 103 a wire, pipe, or cable 2, may be arranged as depicted. The through hole 103 may however be of other geometrical shapes, and sizes, preferably chosen for tightly fitting around a cable, wire or pipe 2. The circular frame 1 is further arranged with pressure applying devices 6 between the frame 3 and the insert blocks 4. The number and geometrical shape of insert blocks 4, solid blocks and pressure applying devices 6 may be adjusted according to the wires, pipes, or cables 2 as well as the wall portion in which the frame 3 is to be mounted. In the depicted embodiments a fluid connection may be arranged for supplying pressurized fluid to the insert blocks 4 either through the through hole 103 of the insert block 4, as described in regard to FIG. 2, or through the frame 3.

Figure 4A:
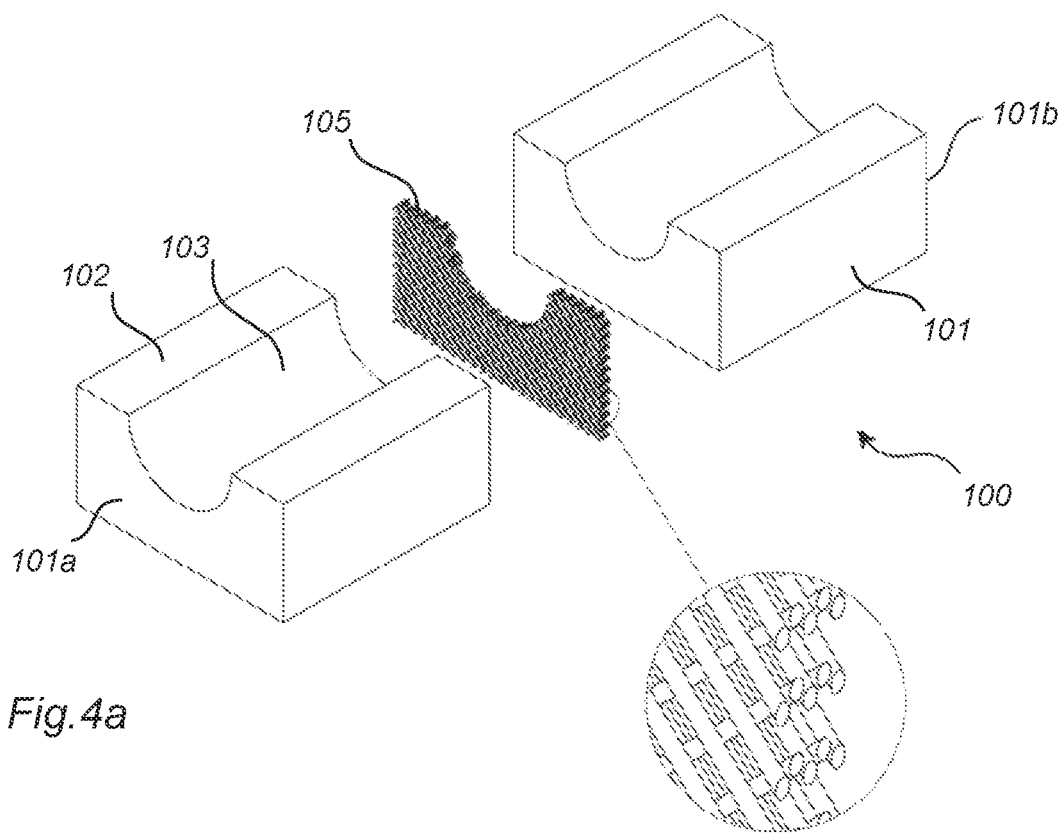
FIGS. 4a and 4b illustrates perspective views of an embodiment of an insert half according to the invention.
Figure 4B:
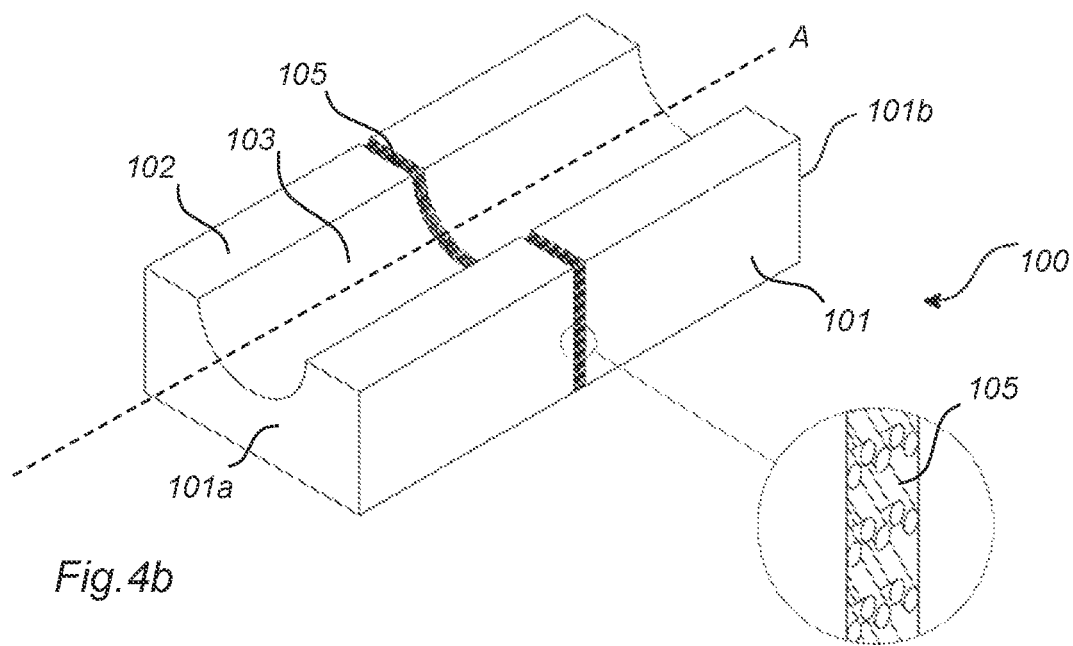

In FIGS. 4a and 4b there is illustrated an insert half 100 according to an embodiment of the invention. The insert half 100 comprises a body 101 comprising an elastic material, preferably a rubber material. The insert half body 100 is extending along an axis A, having a first end 101a and a second end 101b. The depicted body 101 is arranged with a groove 103, in a first side 102. The groove 103 is intended to be arranged around a cable, wire, or pipe. Further, the first side 102 of the body 101 is intended to be arranged against the first side 102 of a separate insert half 100, thus accomplishing an insert block, as described previously. The grooves 103 of the two insert blocks would thus together form an essentially cylindrical through hole through the insert block. Other arrangements may however utilize insert halves 100 having grooves of other shapes or sizes than depicted in FIGS. 4a and 4b. This may beneficially be chosen based on the cable, wire or pipe which is to be arranged through the insert block.

Further, the insert half 100 comprises a permeable layer 105. As depicted, the permeable layer 105 extends through the insert half 100, in a plane transverse to the longitudinal direction of the axis A. Thus, reaching all sides of the insert half. Other embodiments may however utilize a permeable layer 105 extending only partially through the body 101. In other embodiments the permeable layer may be arranged at one end of the insert block in a plane transverse to the longitudinal direction of the axis A.

In an embodiment where a plurality of insert blocks are to be arranged along the axis A, the arrangement with the permeable layer 105 located at least at one end may be particularly beneficial. In embodiments where a single insert block is arranged in the direction of the axis A, it may be beneficial to utilize insert blocks having a permeable layer arranged between the two ends, thus having the insert half body sealing the permeable membrane in the direction of the axis A.

The permeable layer 105 depicted is a synthetic semi-permeable layer, beneficially the material is a plastic material, however other alternatives are possible. The semi-permeable layer 105 may for example allow a pressurized fluid to pass through the permeable layer 105. The permeable layer beneficially has a width of 2-5 mm and more preferably 3-4 mm, which is the depicted embodiment. Arranging a plurality of insert halves 100 next to each other, in a frame as depicted in FIG. 1, will form a fluid communication system by the fluid permeable layers of the insert blocks. This fluid communication system will allow a pressurized fluid to pass through the permeable layer of the plurality of insert halves 100. In some embodiments, a plurality of insert blocks may be arranged around one permeable layer. In other words, a plurality of blocks may share a permeable layer, which may for example benefit production costs and assembly.

Figure 5A:
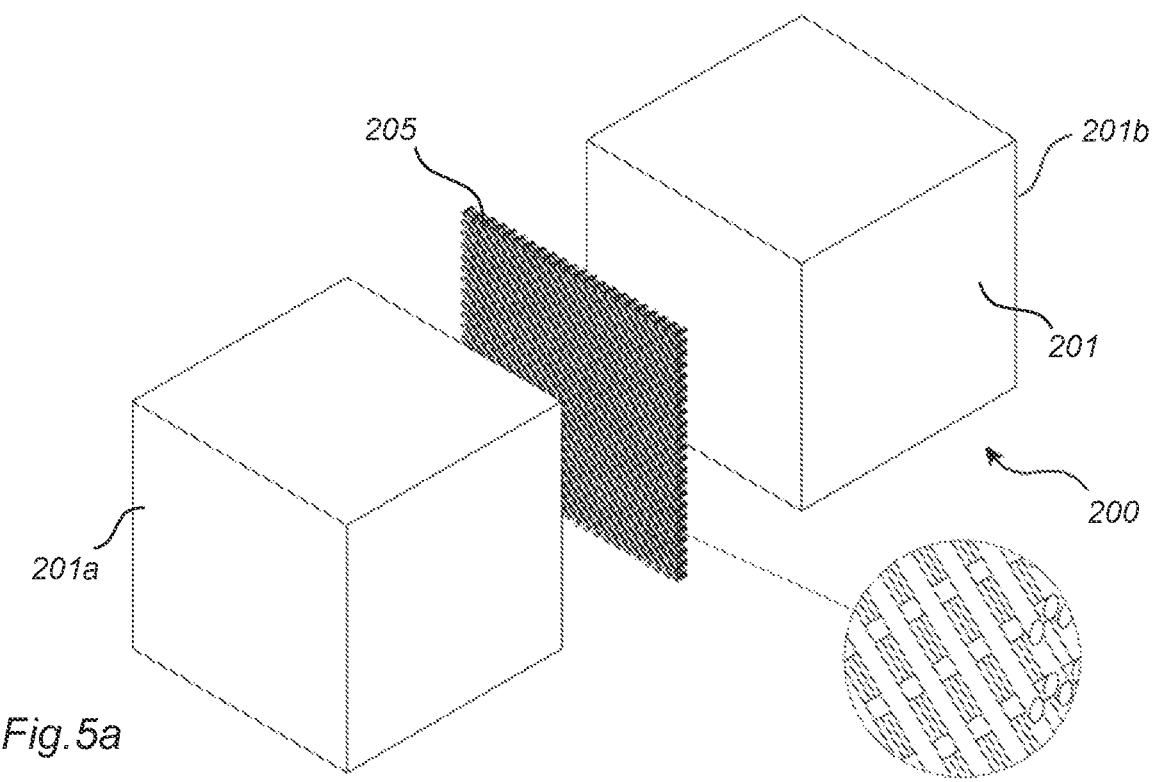
FIGS. 5a and 5b illustrates perspective views of an embodiment of an insert half according to the invention.
Figure 5B:
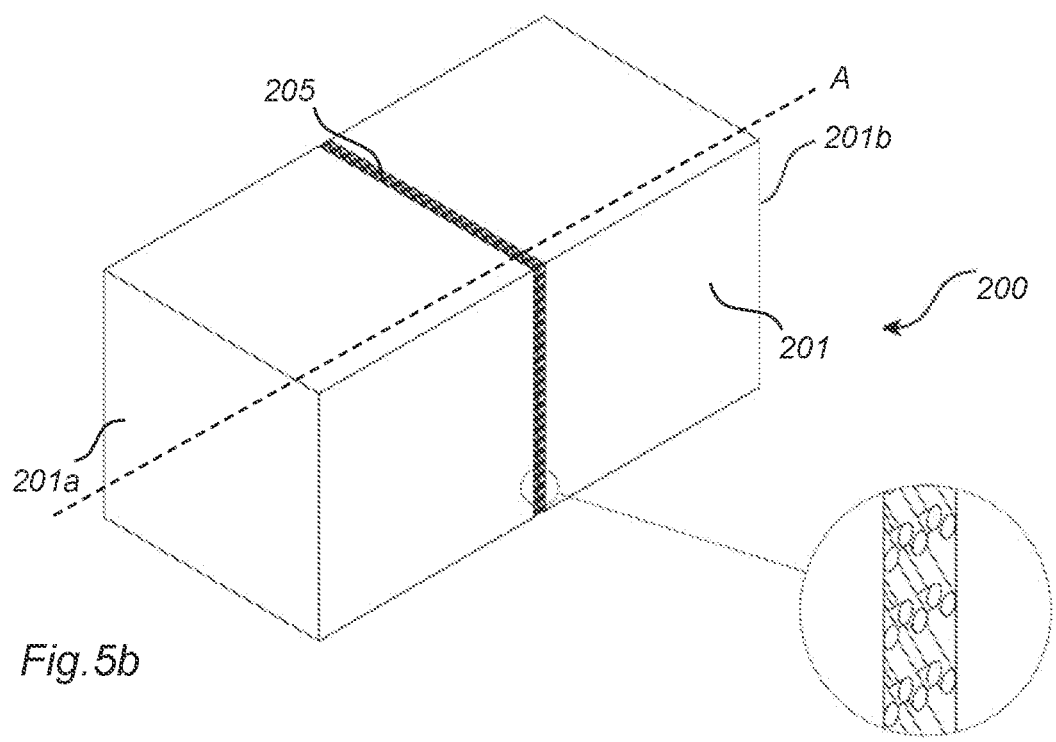

FIGS. 5a and 5b discloses examples of a solid elastic block 200. The block 200 comprises a rectangular body 201, extending along an axis A and comprises a first end 201a and a second end 201b. The block 200 may be arranged to fill the remaining spaces within the frame as described previously. Thus, the block 200 do not provide any opening for a wire, pipe, or tube to be arranged through the block 200. The solid elastic rectangular blocks 200 do however comprise a permeable layer 205 extending through the block, in a plane transverse to the longitudinal direction of the axis A. Thus, when arranged in a frame along with the insert halves as described in FIGS. 4a and 4b, the solid elastic blocks 200 may fill a frame as described in FIG. 1 and be beneficial in the process of detecting leakage in insert halves. The permeable layer 205 may thus create a fluid communication system for a pressurized fluid, to pass through both solid elastic block as well as insert halves arranged around a pipe, wire, or tube.

The invention claimed is:

1. A sealing system for sealing around cables, wires or pipes extending through a partition wall, the system comprising:
   a frame to be arranged in the partition wall;
   a plurality of insert blocks, each formed by two insert halves, each insert half comprising:
      a body with a first end and a second end;
      a first side arranged towards a corresponding first side of a substantially identical insert half, forming an insert block; and
      a groove arranged in the first side and extending between the first and second end along an axis A;
      wherein the body comprising a fluid permeable layer extending in a plane transverse to the longitudinal direction of the axis A;
   wherein the two insert halves are arranged with their respective groove facing each other such that a passage for a cable, wire or pipe is formed, and the plurality of insert blocks to be fitted around the cables, wires or pipes are arranged within the frame such that a fluid communication system is formed by the fluid permeable layers of the plurality of insert blocks;
   wherein the system further comprising:
   a pressure applying device arranged within the frame to apply a pressure on the plurality of insert blocks within the frame to seal the space within the frame between the plurality of insert blocks and the pressure applying device; and
   a device to be connected to a supply of pressurized fluid and direct the pressurized fluid to the communication system formed by the permeable layers of the plurality of insert blocks;
   wherein the sealing system comprising the supply of pressurized fluid and a gauge showing pressure loss;
   wherein the fluid permeable layer consists only of a polymer material.

2. The sealing system as set forth in claim 1, wherein the insert half further comprising a second side opposite the first side, wherein the fluid permeable layer extends from the first side to the second side, and wherein the groove arranged in the first side is in fluid connection with the outside surface of the second side.

3. The sealing system as set forth in claim 1, wherein the fluid permeable layer is arranged essentially with equal distance to the first end and the second end.

4. The sealing system as set forth in claim 1, wherein the fluid permeable layer comprises a synthetic semipermeable material.

5. The sealing system as set forth in claim 1, wherein the fluid permeable layer has a width in the range of 2-5 mm.

6. The sealing system as set forth in claim 1, wherein the insert half body has a rectangular cross-sectional shape transverse to axis A.

7. The sealing system as set forth in claim 1, wherein the groove has a substantially semi-cylindrical or rectangular cross-sectional shape along axis A.

8. The sealing system as set forth in claim 1, wherein the sealing system comprises a liquid leak detection source.

9. A method for testing a sealing system as set forth in claim 1 in order to detect potential pressure loss, the method comprising the steps of:
   a. fitting one insert block around each cable, wire, or pipe extending through the frame;
   b. arranging the insert blocks in the frame;
   c. sealing the sealing system with the pressure applying device;
   d. applying the pressurized fluid to the communication system formed by the fluid permeable layers of the plurality of insert blocks; and
   e. detecting potential pressure loss to verify acceptable installation.

10. The method as set forth in claim 9, further comprising the step of increasing the pressure of the applied pressurized fluid for detecting potential pressure loss.

11. The method as set forth in claim 9, wherein a detected pressure loss is compared to a predetermined pressure loss threshold for an acceptable installation.

* * * * *